United States Patent [19]

Kemper

[11] 4,041,765

[45] Aug. 16, 1977

[54] PRESS BRAKE GUARD

[76] Inventor: Morton L. Kemper, P.O. Box 6, Littlestown, Pa. 17340

[21] Appl. No.: 718,204

[22] Filed: Aug. 26, 1976

[51] Int. Cl.² .......................................... B21D 55/00
[52] U.S. Cl. ...................................... 72/389; 74/612; 100/53
[58] Field of Search .................... 72/389, 455; 74/612; 100/53; 83/546, DIG. 1; 192/133; 425/151

[56] References Cited

U.S. PATENT DOCUMENTS

| 1,103,437 | 7/1914 | Schade | 100/53 |
| 1,584,230 | 5/1926 | Knight | 83/546 |
| 2,868,569 | 1/1959 | Madden | 83/546 |
| 3,687,060 | 8/1972 | Komori | 100/53 |

FOREIGN PATENT DOCUMENTS

| 644,754 | 10/1950 | United Kingdom | 100/53 |
| 965,522 | 7/1964 | United Kingdom | 100/53 |

Primary Examiner—C.W. Lanham
Assistant Examiner—Gene P. Crosby
Attorney, Agent, or Firm—Cushman, Darby & Cushman

[57] ABSTRACT

A safety guard for a pressing brake into which a work piece is inserted manually by an operator standing in front of the machine comprises a horizontal bar disposed between the machine and the operator at somewhat above waist height so as to serve as a stop for the operator's forearms as he manually inserts the work piece. The bar is adjustable vertically and horizontally toward and away from the machine to compensate for differences in the "reach" of the operator so that engagement of the operator's forearms with the bar will prevent insertion of the operator's hands into the pressing area.

4 Claims, 2 Drawing Figures

PRESS BRAKE GUARD

This invention relates to safety guards for preventing entry of an operator's hands into the working area of machines such as pressing brakes.

BACKGROUND AND SUMMARY OF THE INVENTION

Pressing machines of the kind which operate on a work piece inserted into the machine by hand are inherently a source of injury to the operator due to the possibility of the operator accidentally inserting his hands or fingers into the working area of the machine. The working area in a typical pressing machine is the area between a fixed horizontal bed and a vertically movable ram which descends during a pressing operation to shape a work piece such as metal sheet against the bed. In many operations the work piece is manually grasped along one edge by the operator and is placed on the bed while the ram is up. The operator may release the work piece at this point or he may continue to hold the edge of the work piece if the edge lies outside the path of travel of the ram. In either case there is the possibility that the operator's hands or fingers can accidentally be caught between the ram and the work piece or the bed as the shaping operation is carried out.

It is known to provide guards for pressing machines of this type which block access to the work area and thereby prevent entry of both work piece and the operator's hands into the work area. These guards, often constructed in the form of a cage-like structure must be removed in part or in whole before a pressing operation can be carried out, and they therefore do not prevent entry of the operator's hands or fingers into the work area.

The present invention provides a guard for this type of machine which is constructed and arranged to serve as a stop to be engaged by the operator's arms as he extends his arms toward the machine's work area. While not obstructing the passage of the work piece into the work area. The principal element of the guard is a horizontal bar extending along the length of the work area and disposed between the latter and the operator at an elevation above the bed of the machine and somewhat above waist height. In this position there is sufficient space below the bar to permit the work piece in the hands of the operator to pass under the bar and into the work area. As the work piece approaches the work area the operator's forearms approach the bar and contact the same before his hands enter the work area. By previously adjusting the elevation of the bar and its proximity to the work area it is possible to compensate for differences in the "reach" of the operator resulting from variations in the height and arm length of different operators.

In the preferred construction the guard includes the horizontal guard bar, an arm fixed at each end of the bar extending toward the machine, two fixed upright support posts spaced apart a distance equal to the distance between the arms, and connecting means between the inner ends of the arms and the upper ends of the posts for effecting adjustment of bar in a vertical plane parallel to the plane of the posts and in a horizontal plane toward and away from the machine. In this arrangment the support posts can be located quite close to the machine so as not to constitute an obstruction. In addition the arms at the ends of the bar prevent accidental insertion of a person's hands into the work area from the sides of the machine.

DETAILED DESCRIPTION OF EXEMPLARY EMBODIMENT

Figure 1:
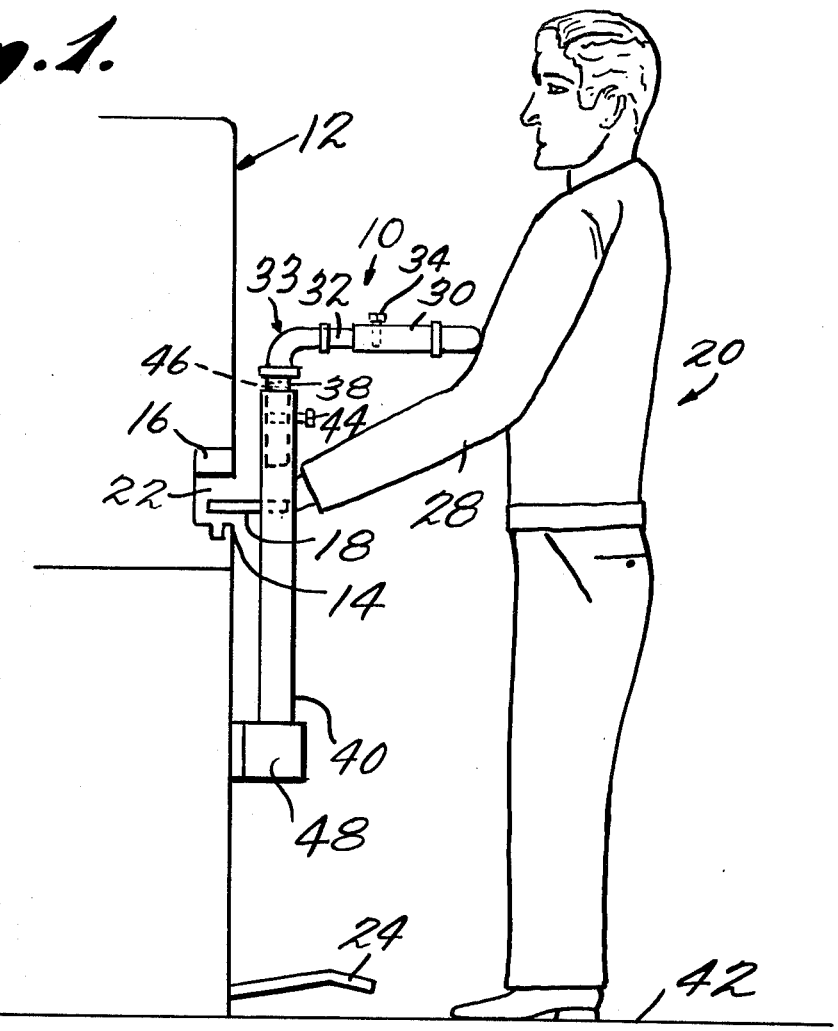
Figure 2:
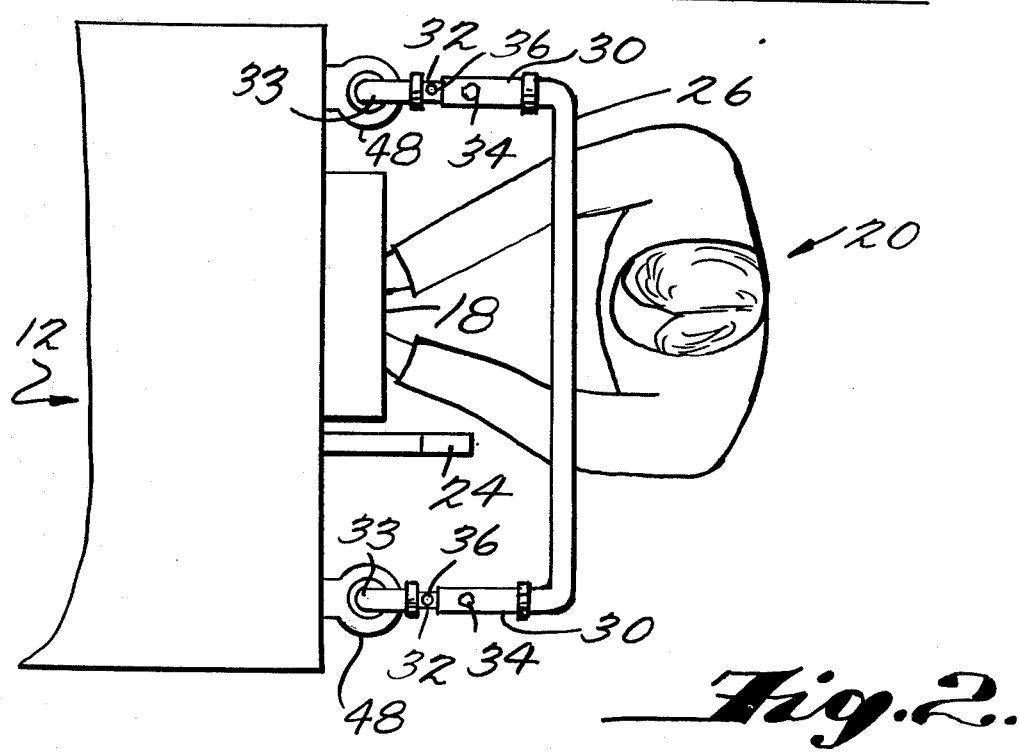

In the drawings:

FIG. 1 is a side elevation of a guard assembly embodying the principles of the invention; and FIG. 2 is a plan view of the guard assembly of FIG. 1.

In the drawings the guard assembly 10 is shown in association with a schematically illustrated pressing machine 12 of the kind having a fixed horizontal bed 14 and a vertically movable ram 16. During operation of such a machine a work piece 18 is manually inserted by an operator 20 into a work area 22 between the bed 14 and the ram 16 and the latter is caused to move downwardly as by mechanical or similar pressure to shape the work piece 18. Movement of the ram can be activated by the operator in any conventional way as by means of a foot pedal 24.

The guard assembly includes a horizontal guard bar 26 which as shown in FIG. 1 is coextensive with the length of the ram 16 and is positioned in front of the press 12 so as to limit movement of the operator's arms 28 toward the work area 22. In the illustrated embodiment of the bar 26 is a length of pipe, and the other parts of the assembly are constructed of pieces of pipe and standard pipe fittings such as 90° elbows and street elbows, although these materials of construction are not in any way critical to the invention.

At each end of the guard bar 26 there is a rigid horizontal arm 30 extending toward the press 12. The inner end of each arm 30, that is the end nearest the press 12, slidably telescopes over a horizontal leg 32 of an angle member 33 so that the bar 26 can be adjusted in a horizontal plane toward and away from the press 12. Each of the arms 30 can be releasably locked to its respective leg 32 in any of several horizontal positions. In the illustrated embodiment a hex head bolt 34 is threaded through the arm 30 into engagement with the leg 32. The legs 32 may be provided with longitudinally spaced-apart holes 36 or depressions to receive the inner ends of the bolts 34.

Each angle member 33 also includes a vertical leg 38 which is slidably telescoped into the upper end of a fixed upright post 40 so that the members 33 and the bar 26 can be adjusted in a vertical plane. The posts 40 are secured at their lower ends thru the use of attaching sockets 48 to the base of the press or to some other fixed structure. Releasable latching means are provided in the form of hex head bolts 44 which are threaded through the walls of the posts into engagement with holes 46 in the legs 38.

In use the guard bar 26 is adjusted horizontally and vertically to a position such that it serves as a stop which limits movement of the operator's arms 28 toward the work area 22 when inserting the work piece 18 into the latter. That is, as the operator 20 moves his arms 28 toward the press 12, with the work piece held in hands, his forearms will approach and engage the bar 26 as illustrated in FIG. 1. In order for this to occur the bar 26 must be located above the bed 12 of the press and spaced horizontally therefrom a sufficient distance for the operator's hands and the work piece 18 to pass underneath the bar 26. The vertical and horizontal position of the bar 26 must also be such that engagement of the operator's forearms 28 with the bar 26 will occur when the operator's hands are still in front of the work. It is also important that the bar 26 be high enough and close enough to the press 12 that it will be essentially impossible for an operator to place his arms over the bar 26 when inserting the work piece 18 into the work area 22.

What is claimed is:

1. In combination with a pressing machine having a vertically movable ram which cooperates with a bed or the like to shape a work piece manually inserted between the ram and the bed by an operator, a safety guard for preventing entry of the operator's hands between the ram and the bed comprising a horizontal bar which is generally coextensive with the horizontal dimension of the ram and bed and a support assembly for said bar for supporting said bar in a position spaced from the machine and between the machine and an operator such that the bar is engaged by the operator's arms as the operator extends his hands and arms toward the machine, said support assembly including means for adjusting the vertical position of the bar relative to the machine and means for adjusting the horizontal position of the bar in a direction transverse to the length of the bar.

2. Apparatus as in claim 1 wherein each end of said bar carries a fixed horizontal arm projecting generally toward the machine and wherein said support assembly includes two spaced-apart fixed upright members, a first angle member having two legs one of which is disposed in parallel slidable engagement with one of the upright members and the other of which is in parallel slidable engagement with one of said arms, a second angle member having two legs one of which is disposed in parallel slidable engagement with the other upright members and the other of which is in parallel slidable engagement with the other of said arms, means releasably locking each upright member to its respective leg and means releasably locking each arm to its respective leg.

3. A guard for a pressing machine comprising a horizontal bar having a horizontal arm at each end projecting at generally a right angle to the bar, two fixed upright members spaced-apart a distance about equal to the length of the bar, first and second angle members each having a first leg disposed generally coaxial with and connected to one of the upright members and a second leg disposed generally coaxial with the other upright member and each of said angle members having a second leg disposed generally coaxial with and connected to one of the arms, means releasably locking each upright member to its respective leg at a variety of coaxial positions, and means releasably locking each arm to its respective leg at a variety of coaxial positions, whereby the bar may be adjusted in vertical and horizontal planes.

4. A guard as in claim 3 wherein said first legs and their respective upright members are telescopically connected and wherein said second legs and their respective arms are telescopically connected.

* * * * *